United States Patent [19]
Larger

[11] 3,815,522
[45] June 11, 1974

[54] PROCESS AND APPARATUS FOR SIMULTANEOUSLY INCINERATING COMBUSTIBLE WASTE AND SLUDGE

[75] Inventor: Dominique Marie Larger, Pont-A-Mousson, France

[73] Assignee: Eau Et Assainissement Socea, Rueil-Malmaison, France

[22] Filed: Jan. 17, 1973

[21] Appl. No.: 324,260

[30] Foreign Application Priority Data
Jan. 31, 1972  France .............................. 72.03087

[52] U.S. Cl. ......... 110/8 R, 110/15, 110/7 R;8 R;15
[51] Int. Cl. ............................................. F23g 5/04
[58] Field of Search ....................................... 210/10

[56]  References Cited
UNITED STATES PATENTS

| | | | |
|---|---|---|---|
| 1,892,681 | 1/1933 | Rankin................................ | 110/8 X |
| 2,062,025 | 11/1936 | Harrington............................ | 110/15 |
| 3,552,333 | 1/1971 | Salamon ................................ | 110/8 |
| 3,589,313 | 6/1971 | Smith et al.......................... | 110/8 X |

*Primary Examiner*—Kenneth W. Sprague
*Attorney, Agent, or Firm*—Sughrue, Rothwell, Mion, Zinn & Macpeak

[57]  ABSTRACT

The sludge is first heated by heat exchange with the fumes of combustion from the combustible waste incinerating furnace. The sludge is then allowed to bake and water is separated from the sludge so as to obtain a residue. The residue is then incinerated and the water separated out is discharged.

14 Claims, 3 Drawing Figures

PATENTED JUN 11 1974　　　　　　　3,815,522

PROCESS AND APPARATUS FOR SIMULTANEOUSLY INCINERATING COMBUSTIBLE WASTE AND SLUDGE

The present invention relates to a process for simultaneously incinerating combustible waste or refuse and sludge and to an apparatus for carrying out said process. This invention more particularly concerns the thermal treating of sludge coming from water purifying stations for the purpose of its incineration.

Various processes have been proposed whereby it is possible to employ the energy produced by the combustion of combustible waste in an incinerating furnace so as to dehydrate the sludge in such manner as to be able to introduce and burn it in the same furnace.

Thus, it is known to dehydrate the sludge by causing it to pass through a heat exchanger heated by the fumes of combustion of household waste or refuse and discharge it directly into the chamber for the combustion of the household waste.

This process has the drawback that the sludge is only dehydrated by evaporation and baking so that the dehydration is not the most complete that it is possible to obtain.

Moreover, in order to obtain a good dehydration it is necessary that the sludge remains a rather long time in the heat exchanger and this results in deposits on, and wear and corrosion of, the heat-exchanger surfaces.

An object of the present invention is to overcome these drawbacks.

The invention provides a process for simultaneously incinerating combustible waste and sludge comprising first heating the sludge by heat exchange directly with the fumes of combustion from the incineration of the combustible waste, and then burning said sludge wherein, between said heating and said incineration, the sludge is allowed to bake and is separated from its water, only the residue of this separation being thereafter burnt while the water separated out is evacuated.

Another object of the invention is to provide an apparatus for simultaneously incinerating combustible waste and sludge comprising a heat exchanger having a sludge circuit and a fumes circuit constituted by a part of the circuit for evacuating the fumes of a furnace for incinerating combustible waste, said apparatus comprising a unit for baking the sludge and separating the sludge from its water which is disposed between the outlet of the sludge circuit of the heat exchanger and a chamber for incinerating the sludge.

This process and apparatus are advantageous in that the heat of the fumes of incineration of the combustible waste is put to use and the cooling and a separation are effected outside the heat exchanger whereby it is possible to pass the sludge rapidly through the exchanger, which considerably reduces accumulation of the sludge and corrosion of the exchanger surfaces.

Further features and advantages of the invention will be apparent from the ensuing description with reference to the accompanying drawings.

Figure 1:
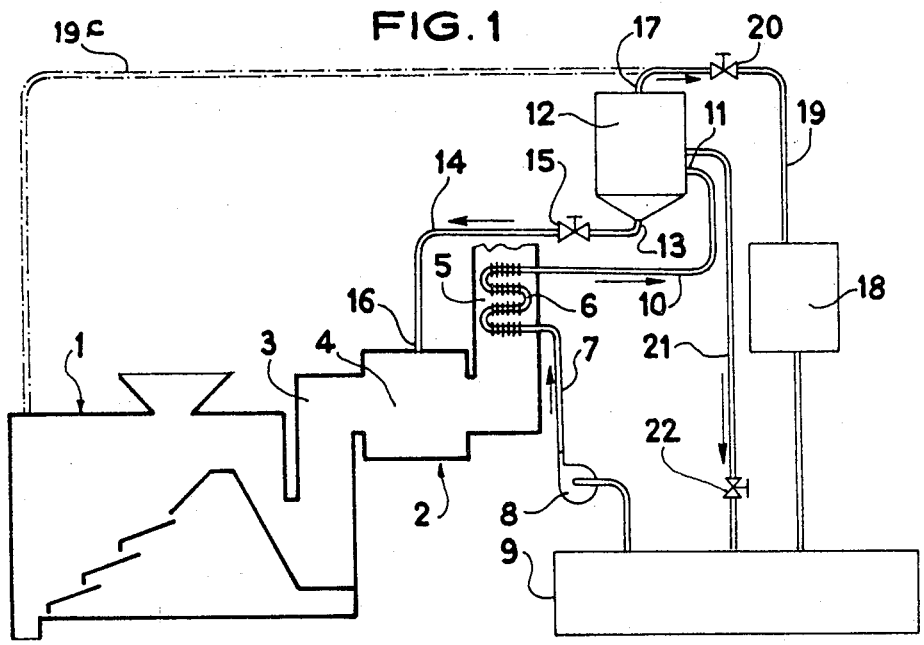
FIG. 1 is a diagrammatic view of an apparatus according to a first embodiment of the invention in which the baking and separation are effected simultaneously.

The apparatus shown in FIG. 1 effects the simultaneous incineration of combustible waste and sludge in an incinerating furnace 1. The stack 2 or circuit for evacuating the fumes from the incinerating furnace 1 comprises, starting from the furnace proper in which the combustible waste is burnt, a vertical conduit 3 for the outlet of the fumes, a horizontal chamber 4 for incinerating the sludge and a vertical conduit 5 for evacuating the fumes. Placed in the conduit 5 is a heat exchanger 6 having a nest of tubes which is connected by piping 7 to a sludge supply pump 8 connected to a sludge purifying station 9, and by piping 10 to a level 11 intermediate the base and upper part of a baking or cooking and decantation vessel 12 which is heat insulated and under pressure. The base 13 of this vessel communicates by way of piping 14 and a reducing valve 15 with the upper part 16 of the sludge combustion chamber 4. The upper part 17 of the vessel is connected to a steam or vapour condenser 18 by way of piping 19 and a reducing valve 20, the vapour thus condensed being returned to the sludge purifying station 9. The water decanted in the vessel 12 above the sludge is also returned to the sludge purifying station by way of piping 21 which is connected to the vessel above the level 11 and includes a reducing valve 22.

This apparatus operates in the following manner.

The sludge supplied by the purifying station is fed under pressure by the supply pump 8 to the heat exchanger 6 which is heated by the fumes which come from the furnace 1 for incinerating the waste and have passed through the sludge incinerating chamber 4. This heat exchanger 6 heats the sludge to its baking temperature. The sludge is then fed to the baking and decantation vessel 12 under pressure in which it stays such time that, while it is maintained at its temperature by the heat insulation, it bakes and then decants. The thus decanted sludge is expanded in the valve 15 and then burnt in the chamber 4. The vapour given off in the vessel 12 is expanded in the valve 20 then condensed in the condenser 18 and the water decanted from the vessel is also returned to the purifying station by way of the piping 21.

In this way the heat given off by the combustion of the combustible waste is employed for heating the sludge to its baking temperature while the sludge does not stay in the heat exchanger during its baking, which reduces soiling and corrosion of the heat exchanger.

Moreover, the baking of the sludge is employed for improving its decantation. Indeed the baking of the sludge brings about a modification in its structure and a coagulating effect which enhances the decantation.

This process permits reducing by two-thirds the amount of sludge to be burnt. Indeed, for example, for 1 kg of sludge to be treated it is possible to separate two-thirds thereof constituted by water, that is 660 g, by employing about 190 Kcal, whereas to evaporate 660 g of the water of the sludge, more than 400 Kcal would be required. This process is therefore of high interest from the point of view of energy consumption and permits starting with sludge having 96 percent water instead of 92 percent and thus simplify the sludge purifying station. Furthermore, it is possible to obtain fumes coming from the incineration of the dried sludge and the combustible waste at a temperature higher than 700°C, at which temperature the odorous vapours are destroyed by oxidation which consequently results in no discharge of odours to the atmosphere. Another advantage of the combustion of the sludge in the fumes of combustion of the combustible waste resides in the fact that the oxygen of these fumes serves to oxidise this sludge and thus improve its combustion in the furnace and even permits burning it in the fumes, this oxygen acting as a comburent. An advantage of the baking and decantation of the sludge in the same vessel under pressure is that it is possible to have a rather low baking temperature, namely 160–190°C. Thus, the decanted water which is returned to the purifying station is less charged, since the lower the baking temperature the lower the amount of impurities dissolved in the water.

Figure 2:
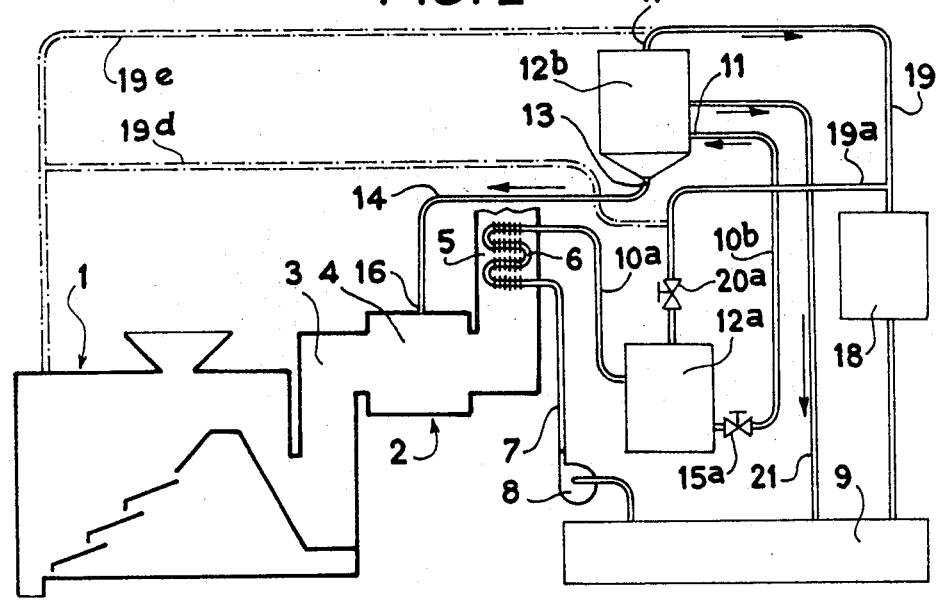
FIG. 2 is a diagrammatic view of an apparatus according to a second embodiment of the invention in which the baking and separation are effected in succession.

The apparatus shown in FIG. 2 is practically identical to that shown in FIG. 1, and the parts identical to those in FIG. 1 carry the same reference numerals, except that the vessel 12 is replaced by merely a decantation vessel $12^b$ which is closed and is at a pressure in the neighbourhood of atmospheric pressure and the piping 10 is replaced by two piping parts $10^a$ and $10^b$ between which is interposed a baking vessel $12^a$ which is heat insulated and under pressure, the upper part of the vessel $12^a$ being connected by way of piping $19^a$ to the condenser 18.

Thus, it is possible to effect in two separate vessels the baking and the decantation of the sludge. The baking is carried out in the vessel $12^a$ which maintains the sludge at its temperature and, after expansion in an expansion valve $15^a$ in the piping $10^b$, the baked sludge is decanted in the vessel $12^b$.

The decanted water and vapour no longer need be expanded before being sent respectively to the purifying station 9 and the condenser 18 and the valve 20 of the apparatus shown in FIG. 1 is therefore dispensed with in this arrangement. On the other hand, the vapour given off during the baking in the vessel $12^a$ must be expanded in a pressure reducing valve $20^a$ before being returned to the condenser 18 by way of the piping $19^a$. As the sludge is no longer under pressure in the vessel $12^b$, the valve 15 of the apparatus shown in FIG. 1 is also omitted in this arrangement.

A modification of the invention would consist in returning the vapour given off in the baking and decantation vessel 12 or the baking vessel $12^a$ and the decantation vessel $12^b$ to the incinerating furnace 1 through pipings $19^c$ or $19^d$ and $19^e$, shown in dot-dash line in FIGS. 1 and 2 respectively, and not to the purifying station 9 by way of the condenser 18.

Figure 3:
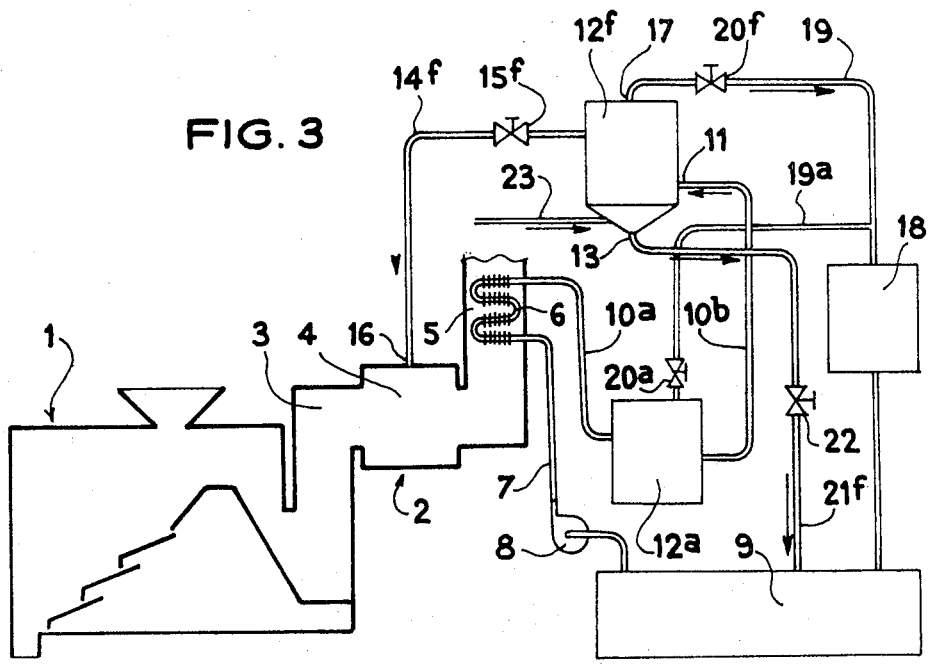
FIG. 3 is a diagrammatic view of an apparatus according to a third embodiment of the invention in which the baking and separation are effected in succession.

The apparatus shown in FIG. 3 is identical to that shown in FIG. 2 (identical parts therefore carry the same reference numerals as in FIG. 2) except that the decantation vessel $12^b$ is replaced by a flotation vessel $12^f$ under pressure, the piping 14 is replaced by piping $14^f$ connected to the upper part of the vessel $12^f$ so as to extract the sludge therefrom and including a pressure reducing valve $15^f$, and the piping 21 is replaced by piping $21^f$ connected to the base 13 of the vessel $12^f$ so as to extract the water of flotation therefrom and including a pressure reducing valve 22. Flotation is made possible by injecting air at the base of the vessel $12^f$ by way of piping 23 so as to introduce bubbles of air which improve the flotation. By way of a modification, the flotation may be achieved by putting the upper part of the flotation vessel under a slight depression by means of the pressure reducing valve $20^f$ connected in the piping 19. The pressure reducing valve $15^a$ of the arrangement shown in FIG. 2 is of course dispensed with. This apparatus is used advantageously in the case of certain sludges which, once baked, cannot be decanted with a very high yield.

Having now described my invention what I claim as new and desire to secure by Letters Patent is:

1. A process for simultaneously incinerating combustible waste and sludge comprising incinerating the combustible waste, heating the sludge in a heat exchanger by heat exchange with fumes of combustion from the incineration of the combustible waste, conducting the heated sludge to a pressure-tight unit and allowing the sludge to bake in the unit and separating water from the sludge contained in the unit so as to obtain a residue and incinerating exclusively said residue, said water separated out being discharged.

2. A process as claimed in claim 1, comprising separating the water from the sludge by decantation.

3. A process as claimed in claim 1, comprising separating the water from the sludge by flotation.

4. A process as claimed in claim 1, comprising effecting said baking of the sludge and said separation of the water from the sludge simultaneously.

5. A process as claimed in claim 1, comprising effecting said baking of the sludge and said separation of the water from the sludge in succession.

6. A process as claimed in claim 1, comprising incinerating said residue of the sludge in direct contact with fumes of combustion coming from the incineration of the combustible waste.

7. An apparatus for carrying out a simultaneous incineration of combustible waste and sludge, comprising a furnace for receiving and incinerating the combustible waste, a circuit for evacuating fumes of combustion from the furnace, a heat exchanger having a sludge circuit for receiving the sludge and a circuit for fumes constituted by a part of the circuit for evacuating the fumes from the furnace, a unit capable of baking the sludge under pressure and separating water from the sludge and having an inlet connected to the sludge circuit of the heat exchanger and an outlet for the baked sludge, and a chamber for incinerating the sludge connected to said outlet.

8. An apparatus as claimed in claim 7, wherein the unit is a sludge baking and decantation unit.

9. An apparatus as claimed in claim 7, wherein the unit is a sludge baking and flotation unit.

10. An apparatus as claimed in claim 7, wherein the unit comprises a single heat insulated vessel put under pressure.

11. An apparatus as claimed in claim 7, wherein the unit comprises a heat insulated baking vessel and a vessel for separating the water from the sludge under pressure connected in series with the baking vessel between said inlet and outlet.

12. An apparatus as claimed in claim 7, wherein the chamber for incinerating the sludge is constituted by a part of the circuit for evacuating fumes from the furnace incinerating the combustible waste.

13. An apparatus as claimed in claim 12, wherein said part of the circuit for evacuating fumes is upstream of the heat exchanger with respect to the travel of the fumes through the circuit for evacuating fumes.

14. An apparatus as claimed in claim 7, comprising a water vapour condenser communicating with the interior of the baking and separating unit.

* * * * *